(12) United States Patent
Yang

(10) Patent No.: US 9,000,649 B2
(45) Date of Patent: Apr. 7, 2015

(54) CROSS-INTERLOCKED MULTI-SET SWITCH TYPE DC BRUSHLESS ELECTRIC MACHINE SYSTEM HAVING AUXILIARY EXCITATION WINDING SET

(76) Inventor: Tai-Her Yang, Dzan-Hwa (TW)

( * ) Notice: Subject to any disclaimer, the term of this patent is extended or adjusted under 35 U.S.C. 154(b) by 388 days.

(21) Appl. No.: 13/493,157

(22) Filed: Jun. 11, 2012

(65) Prior Publication Data

US 2013/0328428 A1 Dec. 12, 2013

(51) Int. Cl.
| H02K 19/38 | (2006.01) |
| H02K 16/00 | (2006.01) |
| H02K 19/12 | (2006.01) |
| H02P 7/06 | (2006.01) |
| H02K 21/04 | (2006.01) |

(52) U.S. Cl.
CPC ............. *H02K 16/00* (2013.01); *H02K 19/12* (2013.01); *H02P 7/06* (2013.01); *H02K 21/042* (2013.01)

(58) Field of Classification Search
CPC ..... H02K 21/042; H02K 16/00; H02K 19/12; H02P 7/06
USPC ................................................. 310/181, 112
See application file for complete search history.

(56) References Cited

U.S. PATENT DOCUMENTS

| 1,646,821 | A | * | 10/1927 | Karapetoff .................... 322/19 |
| 2,437,996 | A | * | 3/1948 | Carnegie et al. ............ 318/758 |
| 2,977,518 | A | * | 3/1961 | Kafka et al. ............. 318/400.17 |
| 3,675,099 | A | * | 7/1972 | Johnston ..................... 318/762 |
| 3,750,000 | A | * | 7/1973 | Bruckner et al. ............ 318/696 |
| 4,260,944 | A | * | 4/1981 | O'Mahony ..................... 322/48 |
| 4,412,794 | A | * | 11/1983 | Presley ...................... 418/61.1 |
| 4,532,458 | A | * | 7/1985 | Kuznetsov et al. ........... 318/111 |
| 4,786,853 | A | * | 11/1988 | VanMaaren ..................... 322/75 |
| 4,959,605 | A | * | 9/1990 | Vaidya et al. ................... 322/10 |
| 5,179,308 | A | * | 1/1993 | Malsky ....................... 310/90.5 |
| 6,278,211 | B1 | * | 8/2001 | Sweo .......................... 310/114 |
| 6,373,204 | B1 | * | 4/2002 | Peterson et al. ............... 318/41 |
| 7,250,734 | B1 | * | 7/2007 | Iannello et al. ............ 318/254.1 |
| 7,859,200 | B2 | * | 12/2010 | Yang .............................. 318/34 |
| 7,915,778 | B2 | * | 3/2011 | Miyata et al. ................. 310/180 |
| 2002/0117934 | A1 | * | 8/2002 | Kanazawa et al. ........... 310/263 |
| 2002/0117935 | A1 | * | 8/2002 | Kanazawa et al. ........... 310/263 |
| 2006/0097670 | A1 | * | 5/2006 | Fukasaku et al. ............ 318/105 |
| 2009/0096310 | A1 | * | 4/2009 | Takeuchi ................. 310/156.36 |
| 2010/0019701 | A1 | * | 1/2010 | Yang ............................. 318/49 |
| 2010/0148717 | A1 | * | 6/2010 | Yang ............................ 318/767 |
| 2012/0134856 | A1 | * | 5/2012 | Wu et al. ....................... 417/350 |

\* cited by examiner

*Primary Examiner* — Alex W Mok
(74) *Attorney, Agent, or Firm* — Bacon & Thomas, PLLC

(57) ABSTRACT

The present invention relates to a multi-set switched DC brushless electric machine having its rotary part of electric machine being installed with an auxiliary excitation winding set, for being connected in series with a magnetic field winding set of electric machine of another electric machine through the auxiliary excitation winding set installed on the rotary part of electric machine, such that the excitation can be variable through altering the current of the magnetic field winding set of electric machine of the another electric machine thereby changing the operational characteristic of the electric machine.

3 Claims, 2 Drawing Sheets

CROSS-INTERLOCKED MULTI-SET SWITCH TYPE DC BRUSHLESS ELECTRIC MACHINE SYSTEM HAVING AUXILIARY EXCITATION WINDING SET

BACKGROUND OF THE INVENTION (a) Field of the Invention

The present invention relates to a multi-set switched DC brushless electric machine having its rotary part of electric machine being installed with an auxiliary excitation winding set, for being connected in series with a magnetic field winding set of electric machine of another electric machine through the auxiliary excitation winding set installed on the rotary part of electric machine, such that the excitation can be variable through altering the current of the magnetic field winding set of electric machine of the another electric machine thereby changing the operational characteristic of the electric machine.

(b) Description of the Prior Art

A conventional switched DC brushless electric machine, e.g. a switched brushless electric machine having permanent magnetic pole or having reluctance rotor, often utilizes a Hall element for sensing locations so as to determine the switch timing, or utilizes an open loop means for allowing the magnetic field winding set to generate sequential excitation for driving the rotary part, so that there is a shortage of the mentioned structure that each switched DC brushless electric machine requires an individual electromechanical control unit.

SUMMARY OF THE INVENTION

The present invention relates to a cross-interlocked multi-set switch type DC brushless electric machine system having auxiliary excitation winding set in which a first switched DC brushless electric machine (1001) having its first rotary part of electric machine (104) composed of a first permanent magnetic rotary part of electric machine or a first reluctance rotary part of electric machine being installed with a first auxiliary excitation winding set, and a first electric conductive annular brush device (107) is served as an interface for transmitting electric power, thereby performing auxiliary excitation or differential excitation to the magnetic pole of the first rotary part of electric machine (104) of the first switched DC brushless electric machine (1001);

the first auxiliary excitation winding set includes a first serial type auxiliary excitation winding set (105) and/or a first parallel type auxiliary excitation winding set (108), wherein the first serial type auxiliary excitation winding set (105) is connected in series with the DC power input end of a second magnetic field winding set of electric machine (202) of a second switched DC brushless electric machine (1002), thereby being enabled to perform variable excitation through altering the loading current of the second switched DC brushless electric machine (1002);

and a second rotary part of electric machine (204) composed of a second permanent magnetic rotary part of electric machine or a second reluctance rotary part of electric machine of the second switched DC brushless electric machine (1002) is installed with a second auxiliary excitation winding set, and a second electric conductive annular brush device (207) is served as an interface for transmitting electric power, thereby performing auxiliary excitation or differential excitation to the magnetic pole of the second rotary part of electric machine (204) of the second switched DC brushless electric machine (1002);

the second auxiliary excitation winding set includes a second serial type auxiliary excitation winding set (205) and/or a second parallel type auxiliary excitation winding set (208), wherein the second serial type auxiliary excitation winding set (205) is connected in series with the DC power input end of the first magnetic field winding set of electric machine (102) of the first switched DC brushless electric machine (1001), thereby being enabled to perform variable excitation through altering the loading current of the first switched DC brushless electric machine (1001);

wherein the second serial type auxiliary excitation winding set (205) is connected in series between a first drive control device (103) served to drive and control the first magnetic field winding set of electric machine (102) and the DC power source;

the first serial type auxiliary excitation winding set (105) is connected in series between a second drive control device (203) served to drive and control the second magnetic field winding set of electric machine (202) and the DC power source;

with the mentioned electric circuit devices, a cross-interlocked multi-set switch type DC brushless electric machine system having a first serial type auxiliary excitation winding set (105) and a second serial type auxiliary excitation winding set (205) is assembled;

moreover, the first parallel type auxiliary excitation winding set (108) and the second parallel type auxiliary excitation winding set (208) can be simultaneously installed for being connected in parallel with the DC power source, thereby constituting a cross-interlocked multi-set switch type DC brushless electric machine system having a first serial type auxiliary excitation winding set (105), a second serial type auxiliary excitation winding set (205), a first parallel type auxiliary excitation winding set (108) and a second parallel type auxiliary excitation winding set (208).

DESCRIPTION OF MAIN COMPONENT SYMBOLS

Figure 1:
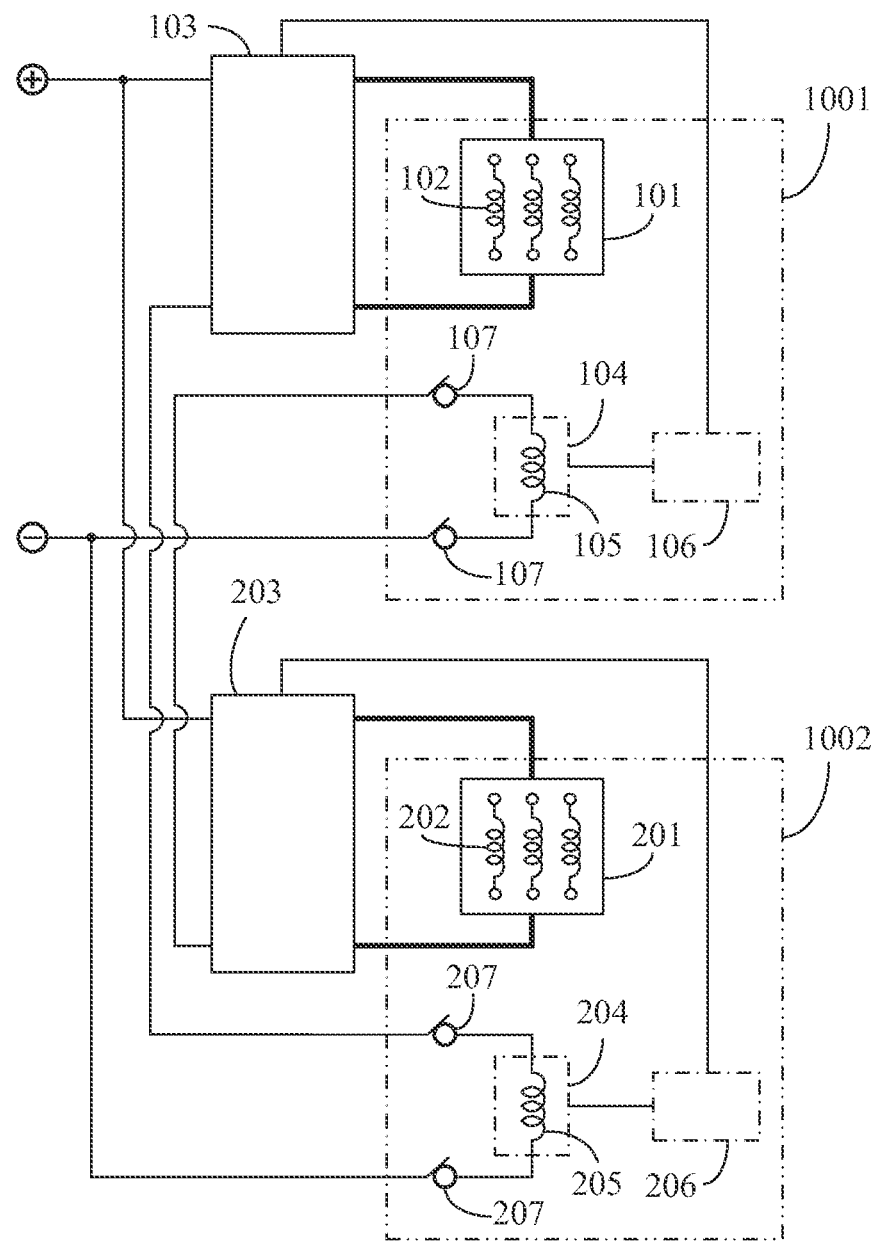
FIG. 1 is a schematic block diagram illustrating the cross-interlocked multi-set switch type DC brushless electric machine system being installed with the first serial type auxiliary excitation winding set (105) and the second serial type auxiliary excitation winding set (205), according to the present invention.

101: First magnetic field structure of electric machine
1001: First switched DC brushless electric machine
1002: Second switched DC brushless electric machine
102: First magnetic field winding set of electric machine
103: First drive control device
104: First rotary part of electric machine
105: First serial type auxiliary excitation winding set
106: First electric machine angular position sensor
107: First electric conductive annular brush device
108: First parallel type auxiliary excitation winding set
201: Second magnetic field structure of electric machine

202: Second magnetic field winding set of electric machine
203: Second drive control device
204: Second rotary part of electric machine
205: Second serial type auxiliary excitation winding set
206: Second electric machine angular position sensor
207: Second electric conductive annular brush device
208: Second parallel type auxiliary excitation winding set

DETAILED DESCRIPTION OF THE PREFERRED EMBODIMENTS

A conventional switched DC brushless electric machine, e.g. a switched brushless electric machine having permanent magnetic pole or having reluctance rotor, often utilizes a Hall element for sensing locations so as to determine the switch timing, or utilizes an open loop means for allowing the magnetic field winding set to generate sequential excitation for driving the rotary part, so that there is a shortage of the mentioned structure that each switched DC brushless electric machine requires an individual electromechanical control unit.

The present invention relates to a multi-set switched DC brushless electric machine having its rotary part of electric machine being installed with an auxiliary excitation winding set, for being connected in series with a magnetic field winding set of electric machine of another electric machine through the auxiliary excitation winding set installed on the rotary part of electric machine, such that the excitation can be variable through altering the current of the magnetic field winding set of electric machine of the another electric machine.

Figure 2:
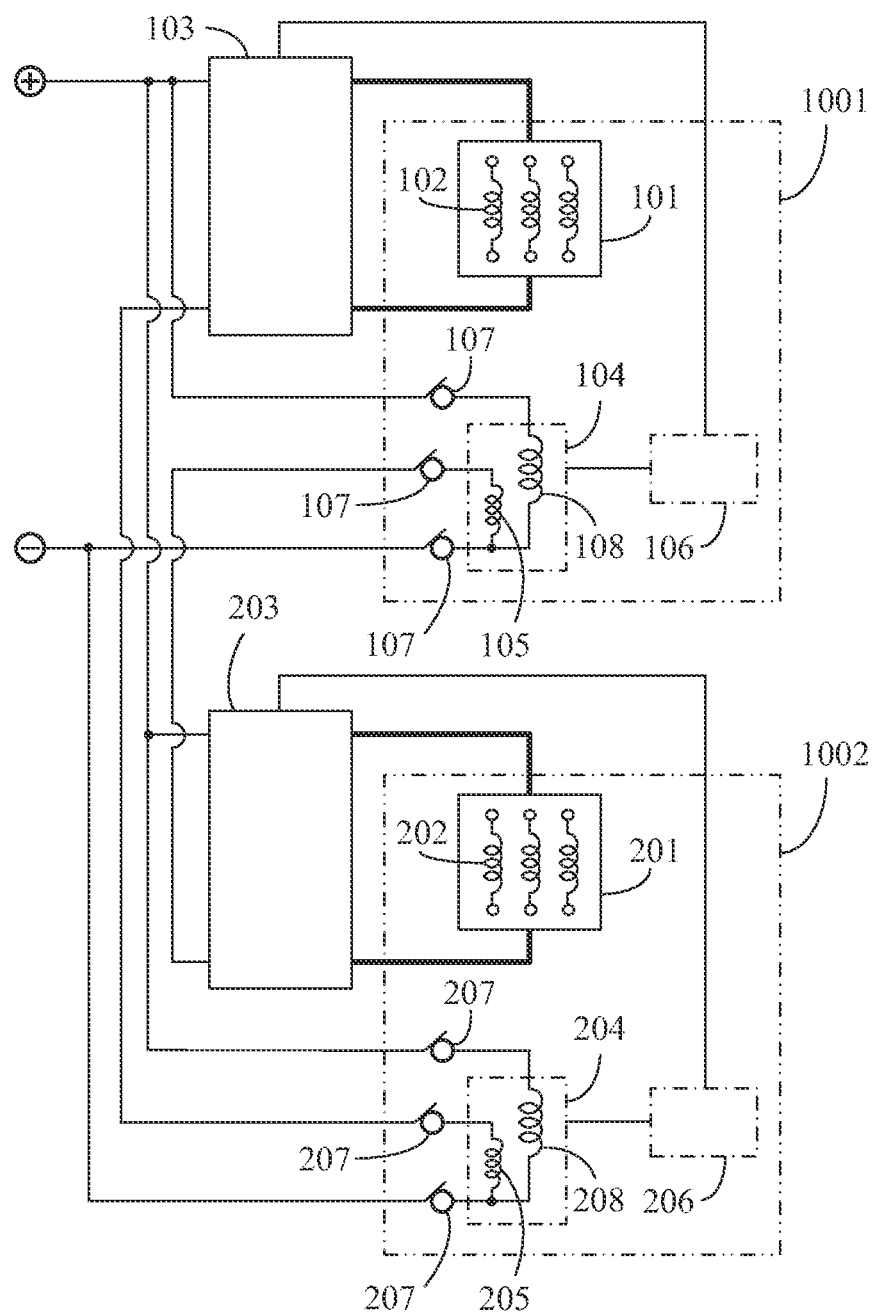
FIG. 2 is a schematic block diagram illustrating the cross-interlocked multi-set switch type DC brushless electric machine system being installed with the first serial type auxiliary excitation winding set (105), the second serial type auxiliary excitation winding set (205), the first parallel type auxiliary excitation winding set (108) and the second parallel type auxiliary excitation winding set (208), according to the present invention.

FIG. 1 is a schematic block diagram illustrating the cross-interlocked multi-set switched DC brushless electric machine system being installed with the first serial type auxiliary excitation winding set (105) and the second serial type auxiliary excitation winding set (205), according to the present invention;

As shown in FIG. 1, it mainly consists of:

first drive control device (103): constituted by a drive electric control device composed of electromechanical components and/or solid sate components and/or microprocessors, served to receive signals from the first electric machine angular position sensor (106), for controlling the timing, the polarity, the phase sequence and the value of voltage and current of the power supply excitation while the first magnetic field winding set of electric machine (102) being operated as a motor, or controlling the timing, the polarity, the phase sequence and the value of voltage and current of outputting electric power while being operated as a power generator;

first magnetic field structure of electric machine (101): constituted by magnetic conductive iron cores and installed with the first magnetic field winding set of electric machine (102) having two or more phases, coupled to the first rotary part of electric machine (104), the magnetic loop formed by the first magnetic field structure of electric machine (101) and the first rotary part of electric machine (104) allows the shifting magnetic field of the first magnetic field winding set of electric machine (102) to pass, thereby generating the electromechanical effect between the first magnetic field structure of electric machine (101) and the first rotary part of electric machine (104);

first magnetic field winding set of electric machine (102): constituted by a winding set installed in the first magnetic field structure of electric machine (101) having two or more phases; controlled by the excitation control of the first drive control device (103) while being operated as a motor, thereby generating magnetic fields with opposite shifting directions, and generating a motor actuation effect with the first rotary part of electric machine (104); while being operated as a power generator, the first magnetic field winding set of electric machine (102) is controlled by the first drive control device (103) thereby controlling the voltage and current of outputting electric power;

first electric machine angular position sensor (106): constituted by an electromechanical type switch, a Hall element or a physical location sensor such as photoelectron or electromagnetic induction, or ultrasonic or electrostatic induction; installed between the first magnetic field structure of electric machine (101) and the first rotary part of electric machine (104) which relatively revolve, thereby sensing the relative location relation between the shifting magnetic field generated by the first magnetic field winding set of electric machine (102) of the first magnetic field structure of electric machine (101) and the first rotary part of electric machine (104), and sending the sensing signals to the first drive control device (103);

first rotary part of electric machine (104): constituted by magnetic conductive materials, and installed with a rotation shaft and a housing, the characteristic is being coupled at a lateral side of the first magnetic field structure of electric machine (101), provided with a salient pole structure having magnetic conductive feature and having the magnetic poles with the quantity same as or different from that of the first magnetic field structure of electric machine (101), or having permanent magnetic pole and having the magnetic poles with the quantity same as or different from that of the first magnetic field structure of electric machine (101), the characteristic is that the magnetic pole of the first rotary part of electric machine (104) being installed with the auxiliary excitation winding set thereby transmitting the excitation electric power between the mentioned winding set and the exterior through the first electric conductive annular brush device (107);

first auxiliary excitation winding set: constituted by conductive wires wound on the magnetic pole of the first rotary part of electric machine (104), and transmitting the electric power between the mentioned winding set and the exterior through the first electric conductive annular brush device (107), the installation means includes installing the first serial type auxiliary excitation winding set (105), wherein the first serial type auxiliary excitation winding set (105) is through the first electric conductive annular brush device (107) for being connected in series with the electric power input end of the second drive control device (203) having its output end served to drive and control the second magnetic field winding set of electric machine (202) then leaded to the DC power source;

first electric conductive annular brush device (107): constituted by the electric conductive ring and the electric conductive brush, served for respectively installed between the revolving rotary part of electric machine and the exterior, so while the rotary part revolving, the electric power is enabled to be transmitted between the first serial type auxiliary excitation winding set (105) and the exterior;

With the housing, the bearing or locking screws, the first switched DC brushless electric machine (1001) can be assembled by the mentioned components, wherein the first drive control device (103) can be co-structured with the first switched DC brushless electric machine (1001) or separately provided;

second drive control device (203): constituted by a drive electric control device composed of electromechanical components and/or solid sate components and/or microprocessors, served to receive signals from the second electric machine angular position sensor (206), for controlling the timing, the polarity, the phase sequence and the value of voltage and current of the power supply excitation while the second magnetic field winding set of electric machine (202) being operated as a motor, or controlling the timing, the polarity, the phase sequence and the value of voltage and current of outputting electric power while being operated as a power generator;

second magnetic field structure of electric machine (201): constituted by magnetic conductive iron cores and installed with the second magnetic field winding set of electric machine (202) having two or more phases, coupled to the second rotary part of electric machine (204), the magnetic loop formed by the second magnetic field structure of electric machine (121) and the second rotary part of electric machine (204) allows the shifting magnetic field of the second magnetic field winding set of electric machine (202) to pass, thereby generating the electromechanical effect between the second magnetic field structure of electric machine (201) and the second rotary part of electric machine (204);

second magnetic field winding set of electric machine (202): constituted by a winding set installed in the second magnetic field structure of electric machine (201) having two or more phases; controlled by the excitation control of the second drive control device (203) while being operated as a motor, thereby generating magnetic fields with opposite shifting directions, and generating a motor actuation effect with the second rotary part of electric machine (204); while being operated as a power generator, the second magnetic field winding set of electric machine (202) is controlled by the second drive control device (203) thereby controlling the voltage and current of outputting electric power;

second electric machine angular position sensor (206): constituted by an electromechanical type switch, a Hall element or a physical location sensor such as photoelectron or electromagnetic induction, or ultrasonic or electrostatic induction; installed between the second magnetic field structure of electric machine (201) and the second rotary part of electric machine (204) which relatively revolve, thereby sensing the relative location relation between the shifting magnetic field generated by the second magnetic field winding set of electric machine (202) of the second magnetic field structure of electric machine (201) and the second rotary part of electric machine (204), and sending the sensing signals to the second drive control device (203);

second rotary part of electric machine (204): constituted by magnetic conductive materials, and installed with a rotation shaft and a housing, the characteristic is being coupled at a lateral side of the second magnetic field structure of electric machine (201), provided with a salient pole structure having magnetic conductive feature and having the magnetic poles with the quantity same as or different from that of the second magnetic field structure of electric machine (201), or having permanent magnetic pole and having the magnetic poles with the quantity same as or different from that of the second magnetic field structure of electric machine (201), the characteristic is that the magnetic pole of the second rotary part of electric machine (204) being installed with the auxiliary excitation winding set thereby transmitting the excitation electric power between the mentioned winding set and the exterior through the second electric conductive annular brush device (207);

second auxiliary excitation winding set: constituted by conductive wires wound on the magnetic pole of the second rotary part of electric machine (204), and transmitting the electric power between the mentioned winding set and the exterior through the second electric conductive annular brush device (207), the installation means include installing the second serial type auxiliary excitation winding set (205), wherein the second serial type auxiliary excitation winding set (205) is through the second electric conductive annular brush device (207) for being connected in series with the electric power input end of the first drive control device (103) having its output end served to drive and control the first magnetic field winding set of electric machine (102) then leaded to the DC power source;

second electric conductive annular brush device (207): constituted by the electric conductive ring and the electric conductive brush, served for respectively installed between the revolving rotary part of electric machine and the exterior, so while the rotary part revolving, the electric power is enabled to be transmitted between the second serial type auxiliary excitation winding set (205) and the exterior;

with the housing, the bearing or locking screws, the second switched DC brushless electric machine (1002) can be assembled by the mentioned components, wherein the second drive control device (203) can be co-structured with the second switched DC brushless electric machine (1002) or separately provided;

FIG. 2 is a schematic block diagram illustrating the cross-interlocked multi-set switched DC brushless electric machine system being installed with the first serial type auxiliary excitation winding set (105), the second serial type auxiliary excitation winding set (205), the first parallel type auxiliary excitation winding set (108) and the second parallel type auxiliary excitation winding set (208), according to the present invention;

As shown in FIG. 2, it mainly consists of:

first drive control device (103): constituted by a drive electric control device composed of electromechanical components and/or solid sate components and/or microprocessors, served to receive signals from the first electric machine angular position sensor (106), for controlling the timing, the polarity, the phase sequence and the value of voltage and current of the power supply excitation while the first magnetic field winding set of electric machine (102) being operated as a motor, or controlling the timing, the polarity, the phase sequence and the value of voltage and current of outputting electric power while being operated as a power generator; and controlling the voltage, the current and the polarity of excitation electric power passing the first parallel type auxiliary excitation winding set (108);

first magnetic field structure of electric machine (101): constituted by magnetic conductive iron cores and installed with the first magnetic field winding set of electric machine (102) having two or more phases, coupled to the first rotary part of electric machine (104), the magnetic loop formed by the first magnetic field structure of electric machine (101) and the first rotary part of electric machine (104) allows the shifting magnetic field of the first magnetic field winding set of electric machine (102) to pass, thereby generating the electromechanical effect between the first magnetic field structure of electric machine (101) and the first rotary part of electric machine (104);

first magnetic field winding set of electric machine (102): constituted by a winding set installed in the first magnetic field structure of electric machine (101) having two or more phases; controlled by the excitation control of the first drive control device (103) while being operated as a motor, thereby generating magnetic fields with opposite shifting directions, and generating a motor actuation effect with the first rotary part of electric machine (104); while being operated as a power generator, the first magnetic field winding set of electric machine (102) is controlled by the first drive control device (103) thereby controlling the voltage and current of outputting electric power;

first electric machine angular position sensor (106): constituted by an electromechanical type switch, a Hall element or a physical location sensor such as photoelectron or electromagnetic induction, or ultrasonic or electrostatic induction; installed between the first magnetic field structure of electric machine (101) and the first rotary part of electric machine (104) which relatively revolve, thereby sensing the relative location relation between the shifting magnetic field generated by the first magnetic field winding set of electric machine (102) of the first magnetic field structure of electric machine (101) and the first rotary part of electric machine (104), and sending the sensing signals to the first drive control device (103);

first rotary part of electric machine (104): constituted by magnetic conductive materials, and installed with a rotation shaft and a housing, the characteristic is being coupled at a lateral side of the first magnetic field structure of electric machine (101), provided with a salient pole structure having magnetic conductive feature and having the magnetic poles with the quantity same as or different from that of the first magnetic field structure of electric machine (101), or having permanent magnetic pole and having the magnetic poles with the quantity same as or different from that of the first magnetic field structure of electric machine (101), the characteristic is that the magnetic pole of the first rotary part of electric machine (104) being installed with the auxiliary excitation winding set thereby transmitting the excitation electric power between the mentioned winding set and the exterior through the first electric conductive annular brush device (107);

first auxiliary excitation winding set: constituted by conductive wires wound on the magnetic pole of the first rotary part of electric machine (104), and transmitting the electric power between the mentioned winding set and the exterior through the first electric conductive annular brush device (107), the installation means include installing one or both of the first serial type auxiliary excitation winding set (105) and the first parallel type auxiliary excitation winding set (108), wherein the first serial type auxiliary excitation winding set (105) is through the first electric conductive annular brush device (107) for being connected in series with the electric power input end of the second drive control device (203) having its output end served to drive and control the second magnetic field winding set of electric machine (202) then leaded to the DC power source; the first parallel type auxiliary excitation winding set (108) is connected in parallel with the DC power source or the output end of the first drive control device (103) or two ends of the first magnetic field winding set of electric machine (102);

first electric conductive annular brush device (107): constituted by the electric conductive ring and the electric conductive brush, served for respectively installed between the revolving rotary part of electric machine and the exterior, so while the rotary part revolving, the electric power is enabled to be transmitted between the first serial type auxiliary excitation winding set (105) and/or the first parallel type auxiliary excitation winding set (108) and the exterior;

With the housing, the bearing or locking screws, the first switched DC brushless electric machine (1001) can be assembled by the mentioned components, wherein the first drive control device (103) can be co-structured with the first switched DC brushless electric machine (1001) or separately provided;

second drive control device (203): constituted by a drive electric control device composed of electromechanical components and/or solid sate components and/or microprocessors, served to receive signals from the second electric machine angular position sensor (206), for controlling the timing, the polarity, the phase sequence and the value of voltage and current of the power supply excitation while the second magnetic field winding set of electric machine (202) being operated as a motor, or controlling the timing, the polarity, the phase sequence and the value of voltage and current of outputting electric power while being operated as a power generator; and controlling the voltage, the current and the polarity of the excitation electric power passing the second parallel type auxiliary excitation winding set (208);

second magnetic field structure of electric machine (201): constituted by magnetic conductive iron cores and installed with the second magnetic field winding set of electric machine (202) having two or more phases, coupled to the second rotary part of electric machine (204), the magnetic loop formed by the second magnetic field structure of electric machine (121) and the second rotary part of electric machine (204) allows the shifting magnetic field of the second field winding set of electric machine (202) to pass, thereby generating the electromechanical effect between the second magnetic field structure of electric machine (201) and the second rotary part of electric machine (204);

second magnetic field winding set of electric machine (202): constituted by a winding set installed in the second magnetic field structure of electric machine (201) having two or more phases; controlled by the excitation control of the second drive control device (203) while being operated as a motor, thereby generating magnetic fields with opposite shifting directions, and generating a motor actuation effect with the second rotary part of electric machine (204); while being operated as a power generator, the second magnetic field winding set of electric machine (202) is controlled by the second drive control device (203) thereby controlling the voltage and current of outputting electric power;

second electric machine angular position sensor (206): constituted by an electromechanical type switch, a Hall element or a physical location sensor such as photoelectron or electromagnetic induction, or ultrasonic or electrostatic induction; installed between the second magnetic field structure of electric machine (201) and the second rotary part of electric machine (204) which relatively revolve, thereby sensing the relative location relation between the shifting magnetic field generated by the second magnetic field winding set of electric machine (202) of the second magnetic field structure of electric machine (201) and the second rotary part of electric machine (204), and sending the sensing signals to the second drive control device (203);

second rotary part of electric machine (204): constituted by magnetic conductive materials, and installed with a rotation shaft and a housing, the characteristic is being coupled at a lateral side of the second magnetic field structure of electric machine (201), provided with a salient pole structure having magnetic conductive feature and having the magnetic poles with the quantity same as or different from that of the second magnetic field structure of electric machine (201), or having permanent magnetic pole and having the magnetic poles with the quantity same as or different from that of the second magnetic field structure of electric machine (201), the characteristic is that the magnetic pole of the second rotary part of electric machine (204) being installed with the auxiliary excitation winding set thereby transmitting the excitation electric power between the mentioned winding set and the exterior through the second electric conductive annular brush device (207);

second auxiliary excitation winding set: constituted by conductive wires wound on the magnetic pole of the second rotary part of electric machine (204), and transmitting the electric power between the mentioned winding set and the exterior through the second electric conductive annular brush device (207), the installation means include installing the second serial type auxiliary excitation winding set (205) or the second parallel type auxiliary excitation winding set (208), wherein the second serial type auxiliary excitation winding set (205) is through the second electric conductive annular brush device (207) for being connected in series with the electric power input end of the first drive control device (103) having its output end served to drive and control the first magnetic field winding set of electric machine (102) then leaded to the DC power source; the second parallel type auxiliary excitation winding set (208) is connected in parallel with the DC power source or the output end of the second drive control device (203) or two ends of the second magnetic field winding set of electric machine (202);

second electric conductive annular brush device (207): constituted by the electric conductive ring and the electric conductive brush, served for respectively installed between the revolving rotary part of electric machine and the exterior, so while the rotary part revolving, the electric power is enabled to be transmitted between the second serial type auxiliary excitation winding set (205) and/or the second parallel type auxiliary excitation winding set (208) and the exterior;

with the housing, the bearing or locking screws, the second switched DC brushless electric machine (1002) can be assembled by the mentioned components, wherein the second drive control device (203) can be co-structured with the second switched DC brushless electric machine (1002) or separately provided;

According to the embodiments disclosed in FIG. 1 and FIG. 2 which adopt the first switched DC brushless electric machine (1001) and the second switched DC brushless electric machine (1002) as two examples of the switched DC brushless electric machine, when being practiced, adjacent serial type auxiliary excitation winding sets of two or more switched DC brushless electric machines can be connected in series at the electric power input end of the drive control device served to drive the magnetic field winding set of electric machine, then leaded to the DC power source, and the serial type auxiliary excitation winding set of the last set of switched DC brushless electric machine is connected in series with the electric power input end of the first drive control device served to drive the first magnetic field winding set of electric machine then leaded to the DC power source, thereby constituting the cross-interlocked multi-set switch type DC brushless electric machine system having auxiliary excitation winding set.

The invention claimed is:

1. A cross-interlocked multi-set switch type DC brushless electric machine system having an auxiliary excitation winding set, which relates to a multi-set switched DC brushless electric machine having its rotary part installed with an auxiliary excitation winding set, for being connected in series with a magnetic field winding set of another electric machine through the auxiliary excitation winding set installed on the rotary part of the electric machine, such that the excitation can be variable through altering the current of the magnetic field winding set of the another electric machine, comprising:

a first drive control device (103): constituted by a drive electric control device that serves to receive signals from a first electric machine angular position sensor (106), for controlling the timing, the polarity, the phase sequence and the value of voltage and current of the power supply excitation when a first magnetic field winding set (102) of the electric machine is operated as a motor, or controlling the timing, the polarity, the phase sequence and the value of the voltage and current of output electric power when the electric machine is operated as a power generator;

a first magnetic field structure (101) of the electric machine: installed with the first magnetic field winding set (102) of the electric machine and coupled to the first rotary part (104) of the electric machine, the magnetic loop formed by the first magnetic field structure (101) of the electric machine and the first rotary part (104) of the electric machine allowing the shifting magnetic field of the first magnetic field winding (102) set of the electric machine to pass, thereby generating the electromechanical effect between the first magnetic field structure (101) of the electric machine and the first rotary part (104) of the electric machine;

the first magnetic field winding set (102) of electric machine: constituted by a winding set installed in the first magnetic field structure (101) of the electric machine and having two or more phases; the first magnetic field winding set (102) being controlled by the excitation control of the first drive control device (103) while being operated as a motor, thereby generating magnetic fields with opposite shifting directions, and generating a motor actuation effect with the first rotary part (104) of the electric machine while being operated as a power generator, the first magnetic field winding set (102) of the electric machine being controlled by the first drive control device (103), thereby controlling the voltage and current of output electric power;

a first electric machine angular position sensor (106): installed between the first magnetic field structure (101) of electric machine and the first rotary part of electric machine (104) which relatively revolve, thereby sensing the relative location relation between the shifting magnetic field generated by the first magnetic field winding set (102) of the first magnetic field structure (101) of the electric machine and the first rotary part (104) of the electric machine, and sending the sensing signals to the first drive control device (103);

the first rotary part (104) of the electric machine: constituted by magnetic conductive materials, the first rotary part (104) being coupled at a lateral side of the first magnetic field structure (101) of the electric machine and provided with a salient pole structure having a magnetically conductive feature and having magnetic poles with a quantity that is the same as or different from that of the first magnetic field structure (101) of the electric machine, or having a permanent magnetic pole and having the magnetic poles with the quantity same as or different from that of the first magnetic field structure (101) of the electric machine, the magnetic pole of the first rotary part (104) of the electric machine being installed with the first auxiliary excitation winding set (105) thereby transmitting the excitation electric power between the auxiliary excitation winding set and the exterior through a first electric conductive annular brush device (107);

the first auxiliary excitation winding set: constituted by conductive wires wound on the magnetic pole of the first rotary part (104) of the electric machine, and transmitting the electric power between the first auxiliary winding set and the exterior through the first electric conductive annular brush device (107) and installation means for installing the first auxiliary excitation winding set (105), wherein the first auxiliary excitation winding set (105) is a serial type auxiliary excitation winding set (105) that is, through the first electric conductive annular brush device (107), connected in series with an electric power input end of a second drive control device (203) having an output end that serves to drive and control the second magnetic field winding set (202) of the electric machine, and then to a DC power source;

the first electric conductive annular brush device (107): installed between the first rotary part (104) of the electric machine and the exterior, so while the rotary part revolving, the electric power is enabled to be transmitted between the first serial type auxiliary excitation winding set (105) and the exterior;

a second drive control device (203): constituted by a drive electric control device that serves to receive signals from the second electric machine angular position sensor (206), for controlling the timing, the polarity, the phase sequence and the value of voltage and current of the power supply excitation when the second magnetic field winding set (202) of the electric machine is operated as a motor, or controlling the timing, the polarity, the phase sequence and the value of voltage and current of outputting electric power when the second magnetic field winding set (202) is operated as a power generator;

a second magnetic field structure (201) of the electric machine: installed with the second magnetic field winding set (202) of the electric machine having two or more phases and coupled to a second rotary part (204) of the electric machine, the magnetic loop formed by the second magnetic field structure (201) of electric machine and the second rotary part (204) of the electric machine allowing the shifting magnetic field of the second magnetic field winding set (202) of the electric machine to pass, thereby generating the electromechanical effect between the second magnetic field structure (201) of the electric machine and the second rotary part (204) of the electric machine;

the second magnetic field winding set (202) of the electric machine: constituted by a winding set installed in the second magnetic field structure (201) of the electric machine having two or more phases; controlled by the excitation control of the second drive control device (203) while being operated as a motor, thereby generating magnetic fields with opposite shifting directions, and generating a motor actuation effect with the second rotary part (204) of the electric machine; and while being operated as a power generator, the second magnetic field winding set (202) of the electric machine is controlled by the second drive control device (203) thereby controlling the voltage and current of output electric power;

a second electric machine angular position sensor (206): installed between the second magnetic field structure (201) of the electric machine and the second rotary part (204) of the electric machine which relatively revolve, thereby sensing the relative location relation between the shifting magnetic field generated by the second magnetic field winding set (202) of the second magnetic field structure (201) of the electric machine and the second rotary part (204) of the electric machine, and sending the sensing signals to the second drive control device (203);

the second rotary part (204) of the electric machine: constituted by magnetic conductive materials, the second rotary part (204) being coupled at a lateral side of the second magnetic field structure (201) of the electric machine and provided with a salient pole structure having a magnetically conductive feature and having magnetic poles with a quantity that is the same as or different from that of the second magnetic field structure (201) of the electric machine, or having permanent magnetic poles with a quantity that is the same as or different from that of the second magnetic field structure (201) of the electric machine, the magnetic poles of the second rotary part (204) of the electric machine being installed with the second auxiliary excitation winding set (205), thereby transmitting the excitation electric power between the second auxiliary winding set (205) and the exterior through a second electric conductive annular brush device (207);

the second auxiliary excitation winding set (205): constituted by conductive wires wound on the magnetic pole of the second rotary part (204) of the electric machine, and transmitting the electric power between the second auxiliary winding set (205) and the exterior through the second electric conductive annular brush device (207), and installation means for installing the second auxiliary excitation winding set (205), wherein the second auxiliary excitation winding set (205) is a serial type auxiliary excitation winding set (205) connected through the second electric conductive annular brush device (207) in series with an electric power input end of the first drive control device (103) and having an output end that serves to drive and control the first magnetic field winding set of electric machine (102), and then to the DC power source; and the second electric conductive annular brush device (207): installed between the revolving rotary part (204) of the electric machine and the exterior, so that while the rotary part is revolving, the electric power is enabled to be transmitted between the second serial type auxiliary excitation winding set (205) and the exterior.

2. A cross-interlocked multi-set switch type DC brushless electric machine system having auxiliary excitation winding set as claimed in claim 1, further comprising a first parallel type auxiliary excitation winding set (108) and a second parallel type auxiliary excitation winding set (208), wherein:

The first drive control device (103) controls the voltage, the current and the polarity of excitation electric power passing the first parallel type auxiliary excitation winding set (108);

the installation means installing both the first serial type auxiliary excitation winding set (105) and the first parallel type auxiliary excitation winding set (108), wherein the first parallel type auxiliary excitation winding set (108) is connected in parallel with the DC power source or the output end of the first drive control device (103) or two ends of the first magnetic field winding set of electric machine (102);

the first electric conductive annular brush device (107) transmits power between the first parallel type auxiliary excitation winding set (108) and the exterior;

the second drive control device (203) controls the voltage, the current and the polarity of the excitation electric power passing the second parallel type auxiliary excitation winding set (208);

the installation means is also for installing the second parallel type auxiliary excitation winding set (208), wherein the second parallel type auxiliary excitation winding set (208) is connected in parallel with the DC power source or the output end of the second drive control device (203) or two ends of the second magnetic field winding set of electric machine (202); and the second electric conductive annular brush device (207) transmits power between the second parallel type auxiliary excitation winding set (208) and the exterior.

3. A cross-interlocked multi-set switch type DC brushless electric machine system having auxiliary excitation winding set as claimed in claim 1 or 2, wherein adjacent serial type auxiliary excitation winding sets of two or more switched DC brushless electric machines can be connected in series at the electric power input end of the drive control device that servers to drive the magnetic field winding set of the electric machine, and then connected to the DC power source, and the serial type auxiliary excitation winding set of the last set of switched DC brushless electric machine is connected in series with the electric power input end of the first drive control device that serves to drive the first magnetic field winding set of the electric machine and then connected to the DC power source, thereby constituting the cross-interlocked multi-set switch type DC brushless electric machine system having auxiliary excitation winding sets.

* * * * *